(12) United States Patent
Terao

(10) Patent No.: US 9,817,842 B2
(45) Date of Patent: Nov. 14, 2017

(54) IMAGE PROCESSING APPARATUS, CONTROL METHOD OF IMAGE PROCESSING APPARATUS, AND PROGRAM

(71) Applicant: CANON KABUSHIKI KAISHA, Tokyo (JP)

(72) Inventor: Yoshihide Terao, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 14/789,376

(22) Filed: Jul. 1, 2015

(65) Prior Publication Data

US 2016/0012139 A1  Jan. 14, 2016

(30) Foreign Application Priority Data

Jul. 8, 2014  (JP) ................................. 2014-140682

(51) Int. Cl.
  G06F 21/62  (2013.01)
  G06F 17/30  (2006.01)

(52) U.S. Cl.
  CPC .............................. *G06F 17/30179* (2013.01)

(58) Field of Classification Search
  CPC ................................................ G06F 17/30179
  USPC .......................................................... 726/5
  See application file for complete search history.

(56) References Cited

U.S. PATENT DOCUMENTS

2004/0210762 A1* 10/2004 Kawamoto ............ G06F 21/10
                                                    713/193
2007/0016799 A1*  1/2007 Klint ....................... G06F 21/79
                                                    713/189
2007/0024722 A1*  2/2007 Eura .................. G06F 17/30265
                                                    348/231.2
2007/0024772 A1   2/2007 Childers et al.
2011/0202776 A1*  8/2011 Chen ....................... G06F 21/64
                                                    713/193

FOREIGN PATENT DOCUMENTS

| CN | 101841618 A | 9/2010 |
| CN | 103248782 A | 8/2013 |
| JP | 2001-358864 | 12/2001 |
| JP | 2006-033459 | 2/2006 |

OTHER PUBLICATIONS

Chinese Office Action issued in corresponding Chinese Application No. 201510397816.7 dated Sep. 1, 2017.

* cited by examiner

*Primary Examiner* — Izunna Okeke
*Assistant Examiner* — Sakinah Taylor
(74) *Attorney, Agent, or Firm* — Fitzpatrick, Cella, Harper & Scinto

(57) ABSTRACT

It is an object to reduce a troublesomeness required to export/import an address book (destination table) between image processing apparatuses. For this purpose, at the time of import request of destination data for import, an import instruction to a group destination table is made. A group destination table ID which coincides with a destination table ID obtained from the destination data for import is retrieved. The group destination table associated with the group destination table ID is specified as a group destination table of an import destination side. The destination data obtained from the destination data for import is imported as destination data into the specified group destination table (group destination table DB).

10 Claims, 16 Drawing Sheets

FIG. 4A

<DESTINATION TABLE LIST>

| DESTINATION TABLE 1 ▼ |
|---|
| DESTINATION TABLE 1 |
| DESTINATION TABLE 2 |
| DESTINATION TABLE 3 |
| DESTINATION TABLE 4 |
| DESTINATION TABLE 5 |
| DESTINATION TABLE 6 |
| DESTINATION TABLE 7 |
| DESTINATION TABLE 8 |
| DESTINATION TABLE 9 |
| DESTINATION TABLE 10 |

401

| NAME | TRANSMISSION DESTINATION |
|---|---|
| SHARED SMB | ¥¥172.11.1.1¥smb¥path |
| SHARED MAIL | AAA@test.com |
|  |  |
|  |  |
|  |  |
|  |  |

<GROUP DESTINATION TABLE LIST>

| GROUP DESTINATION TABLE 1 ▼ |
|---|
| GROUP DESTINATION TABLE 1 |
| GROUP DESTINATION TABLE N |

403

| NAME | TRANSMISSION DESTINATION |
|---|---|
| GROUP SMB | ¥¥172.24.1.1¥smb¥path |
| user 1 MAIL | user1@test.com |
|  |  |
|  |  |
|  |  |

| DESTINATION TABLE ID (501) | DESTINATION TABLE (502) | DESTINATION DATA (503) |
|---|---|---|
| 1 | DESTINATION TABLE 1 | DESTINATION 1, DESTINATION 2, DESTINATION 3 |
| 2 | DESTINATION TABLE 2 | DESTINATION 4, DESTINATION 5 |
| ⋮ | ⋮ | ⋮ |
| 10 | DESTINATION TABLE 10 | DESTINATION 99, DESTINATION 100 |

FIG. 5B

| GROUP DESTINATION TABLE ID (504) | GROUP DESTINATION TABLE (505) | USER GROUP (506) | DESTINATION DATA (507) |
|---|---|---|---|
| 1 | GROUP DESTINATION TABLE 1 | GroupA, GroupB, GroupC | DESTINATION 1, DESTINATION 2, DESTINATION 3 |
| 2 | GROUP DESTINATION TABLE 2 | GroupB, GroupD | DESTINATION 4, DESTINATION 5 |
| ⋮ | ⋮ | ⋮ | ⋮ |
| N | GROUP DESTINATION TABLE N | GroupA, GroupN | DESTINATION 49, DESTINATION 50 |

FIG. 5C

| | |
|---|---|
| DESTINATION NAME | GROUP SMB |
| HOST NAME | 172.24.1.1 |
| FOLDER PATH NAME | ¥¥smb¥path |
| USER NAME | userA |
| PASSWORD | ***** |

*FIG. 6*

| GROUP ID | USER GROUP | INCLUDED USER |
|---|---|---|
| 1 | GroupA | UserA, UserB, UserC |
| 2 | GroupB | UserB, UserD |
| ⋮ | ⋮ | ⋮ |
| N | GroupN | UserA, UserN |

FIG. 11A

| IMPORT ERROR |
|---|
| ERROR OCCURRED IN IMPORT.<br><br>USE SETTING OF GROUP DESTINATION TABLE IS OFF.<br>SET USE SETTING OF GROUP DESTINATION TABLE ON. |

FIG. 11B

| IMPORT ERROR |
|---|
| ERROR OCCURRED IN IMPORT.<br><br>NUMBER OF DESTINATION TABLES OF IMPORT DATA EXCEEDS SET NUMBER OF GROUP DESTINATION TABLES. |

FIG. 11C

| IMPORT ERROR |
|---|
| ERROR OCCURRED IN IMPORT.<br><br>NUMBER OF DESTINATIONS IN DESTINATION TABLE OF IMPORT DATA EXCEEDS NUMBER MANAGEABLE BY GROUP DESTINATION TABLE. |

FIG. 14A

BEGIN:VCARD
VERSION:3.0
UID:11111111.00000000D
FN:userA
EMAIL;PREF:userA@tmp.com
ORG:Company1;GENERAL AFFAIRS 1ST SECTION;
N:;userA;
END:VCARD

FIG. 14B

UID, GROUP, MAILNAME, MAILADR, FILEHOSTNAME, FILEHOST, FILEDIR, FILEUSR, FILEPASS
001, group1, userA, userA@tmp.com,,,,,
002, group2,,, hostA, ¥¥hostA, ¥dir1¥tmp, user1, password

FIG. 15

```
  IMPORT OF ADDRESS BOOK

1501
  ▸ FILE PATH:    [ C:¥user¥addressbook.dat ]    [ REFER ▼ ]

IMPORT DESTINATION TABLE TO GROUP DESTINATION TABLE:  [ ✓ ]  ~1502

FILE FORMAT OF IMPORT FILE:         [ vCARD  ▼ ]  ~1503
                                      [ CSV      ]

TAG USED AS GROUP DESTINATION TABLE: [ ORG   ▼ ]  ~1504
                                       [ TITLE    ]
                                       [ ARBITRARY
                                         CHARACTER
                                         STRING   ]

WHICH VALUE SHOULD BE OBTAINED:  [ 1    ▼ ]  ~1505
                                   [ 2      ]
                                   [ 3      ]
                                   [ 4      ]
                                   [ 5      ]
```

IMAGE PROCESSING APPARATUS, CONTROL METHOD OF IMAGE PROCESSING APPARATUS, AND PROGRAM

BACKGROUND OF THE INVENTION

Field of the Invention

The present invention relates to an image processing apparatus, a control method of the image processing apparatus, and a program and, more particularly, is suitable when it is used to import destination data into an image processing apparatus.

Description of the Related Art

In the related arts, an image processing apparatus such as a digital multifunction apparatus or the like has a function for converting a scanned document into electronic data and transmitting the electronic document to an arbitrary transmission destination by E-mail and a function for performing a file transmission (SMB transmission or the like).

There is a case where the destination data at the time of transmitting the electronic document by E-mail or file-transmitting it is stored in an address book managed in the image processing apparatus. When the destination data is stored in the address book, the destination data can be also classified and stored (refer to Japanese Patent Application Laid-Open No. 2001-358864).

The destination data in the address book of the image processing apparatus can be extracted from an external computer terminal via a Web Browser and stored into another image processing apparatus. In the following description, such an operation that the destination data in the address book is extracted is called "export" in accordance with necessity. Such an operation that the extracted destination data is stored into another image processing apparatus is called "import" in accordance with necessity.

It is also possible that communication is directly made between image processing apparatuses without passing through a computer terminal and destination data in an address book of the image processing apparatus is exported and is directly imported into another image processing apparatus (refer to Japanese Patent Application Laid-Open No. 2006-33459).

However, there is a case where functions of the address books in two image processing apparatuses A and B differ. For example, it is now assumed that as a function about the address book, the image processing apparatus A has only a function about the address book which can be referred to by everyone. On the other hand, it is assumed that in addition to the function about the address book which can be referred to by everyone, the image processing apparatus B has a function about the address book in which an access can be restricted every user or group in an interlocking relational manner with a user authentication.

In the related arts, when the destination data in the address book stored in the image processing apparatus A is exported and is imported into the image processing apparatus B, the destination data can be imported only into the same address book as that of the image processing apparatus A on an export source side.

For example, the destination data in the address book which has been stored in the image processing apparatus A and can be referred to by everyone is exported and is imported into the image processing apparatus B, the destination data can be imported only into the address book which can be referred to by everyone.

Therefore, in the case where the image processing apparatus A is replaced by the image processing apparatus B, the following process has to be performed. That is, after the destination data was manually imported into the address book existing hitherto, the destination data has to be moved to an address book which is newly added (address book in which an access can be restricted on a group unit basis or the like in an interlocking relational manner with a user authentication). Thus, a troublesomeness which is required for export and import of the address book increases.

The invention is made in consideration of the foregoing problem and it is an aspect of the invention to reduce a troublesomeness which is required when exporting/importing an address book (destination data) between image processing apparatuses.

SUMMARY OF THE INVENTION

According to an aspect of the invention, there is provided an image processing apparatus comprising: a first obtaining unit configured to obtain, from an external apparatus, at least either destination data in a first destination table or destination data in a second destination table in which a managing method of the destination data differs from that of the first destination table; a second obtaining unit configured to obtain, from the external apparatus, an instruction to import the destination data in the first destination table into the second destination table; and an importing unit configured to import the destination data in the first destination table obtained by the first obtaining unit into the second destination table in the case where the destination data in the second destination table is not obtained by the first obtaining unit and the instruction is obtained by the second obtaining unit.

According to the invention, the troublesomeness which is required when exporting/importing the address book (destination data) between the image processing apparatuses can be reduced.

Further features of the present invention will become apparent from the following description of exemplary embodiments with reference to the attached drawings.

BRIEF DESCRIPTION OF THE DRAWINGS

FIGS. 4A and 4B are diagrams illustrating display examples of a destination list and a group destination list.

FIGS. 5A, 5B, and 5C are diagrams illustrating administration tables for managing destination data and the destination data.

FIG. 6 is a diagram illustrating an administration table for managing the users.

FIGS. 11A, 11B, and 11C are diagrams illustrating error display screens.

FIGS. 14A and 14B are diagrams illustrating examples of description of destination data for import.

FIG. 15 is a diagram illustrating a third example of a display screen to instruct the import.

DESCRIPTION OF THE EMBODIMENTS

Preferred embodiments of the present invention will now be described in detail in accordance with the accompanying drawings.

(First Embodiment)

First, the first embodiment will be described.

Figure 1:
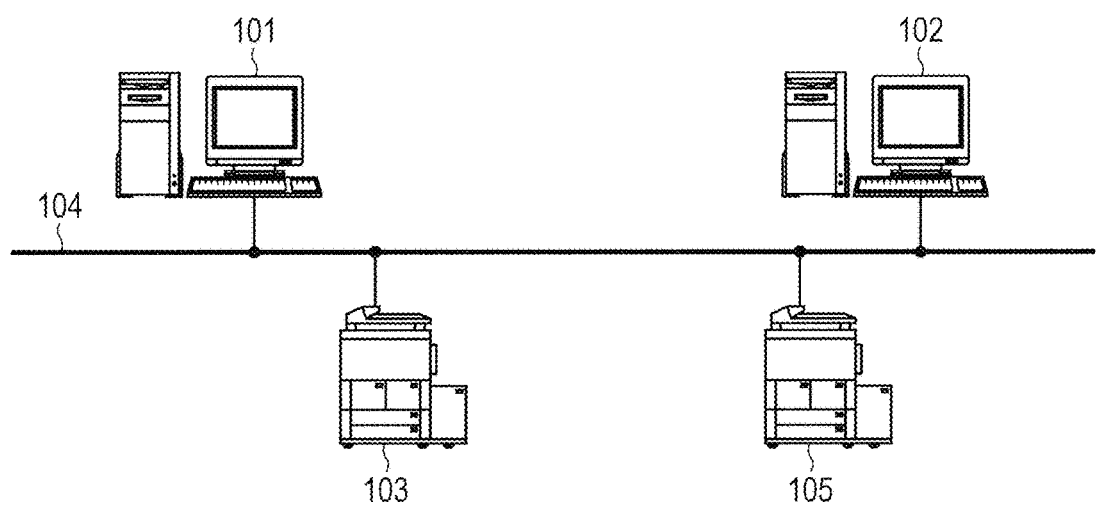
FIG. 1 is a diagram illustrating a construction of an image processing system.

FIG. 1 is a diagram illustrating an example of a construction of an image processing system.

Image processing apparatuses 103 and 105 can convert a scanned paper original into electronic data and transmit to a shared folder or the like of a computer 101 through a network 104.

The image processing apparatuses 103 and 105 have a user authenticating function. When the image processing apparatuses 103 and 105 are operated, whether or not the user authentication is necessary can be set to the image processing apparatuses 103 and 105 by the device administrator.

Although a user name, a password, and the like of each user which are necessary for the user authentication can be also managed in the image processing apparatuses 103 and 105, they can be also managed in an authenticating server 102 on the network 104.

A destination table list 401 and destination data 402 (refer to FIGS. 4A and 5A, which will be described hereinlater) included in a destination table shown in the destination table list 401 have been stored in the image processing apparatus 103. The destination table list 401 and the destination data 402 stored in the image processing apparatus 103 can be exported from the Web Browser of the computer 101 through the network 104.

The destination table list 401 and the destination data 402 exported from the image processing apparatus 103 can be imported into another image processing apparatus 105 through the network 104. In the following description, the destination data including the destination table list exported from the image processing apparatus 103 is called "destination data for import" in accordance with necessity.

By connecting from the image processing apparatus 103 to the image processing apparatus 105 through the network 104, the destination data for import can be directly transmitted to the image processing apparatus 105 without passing through the computer 101.

As mentioned above, in the embodiment, the case where the destination table list 401 and the destination data 402 exported from the image processing apparatus 103 are imported into another image processing apparatus 105 through the network 104 will be described as an example. However, the image processing apparatus for exporting the destination table list 401 and the destination data 402 and the image processing apparatus for importing the destination table list 401 and the destination data 402 may be replaced.

Figure 2:
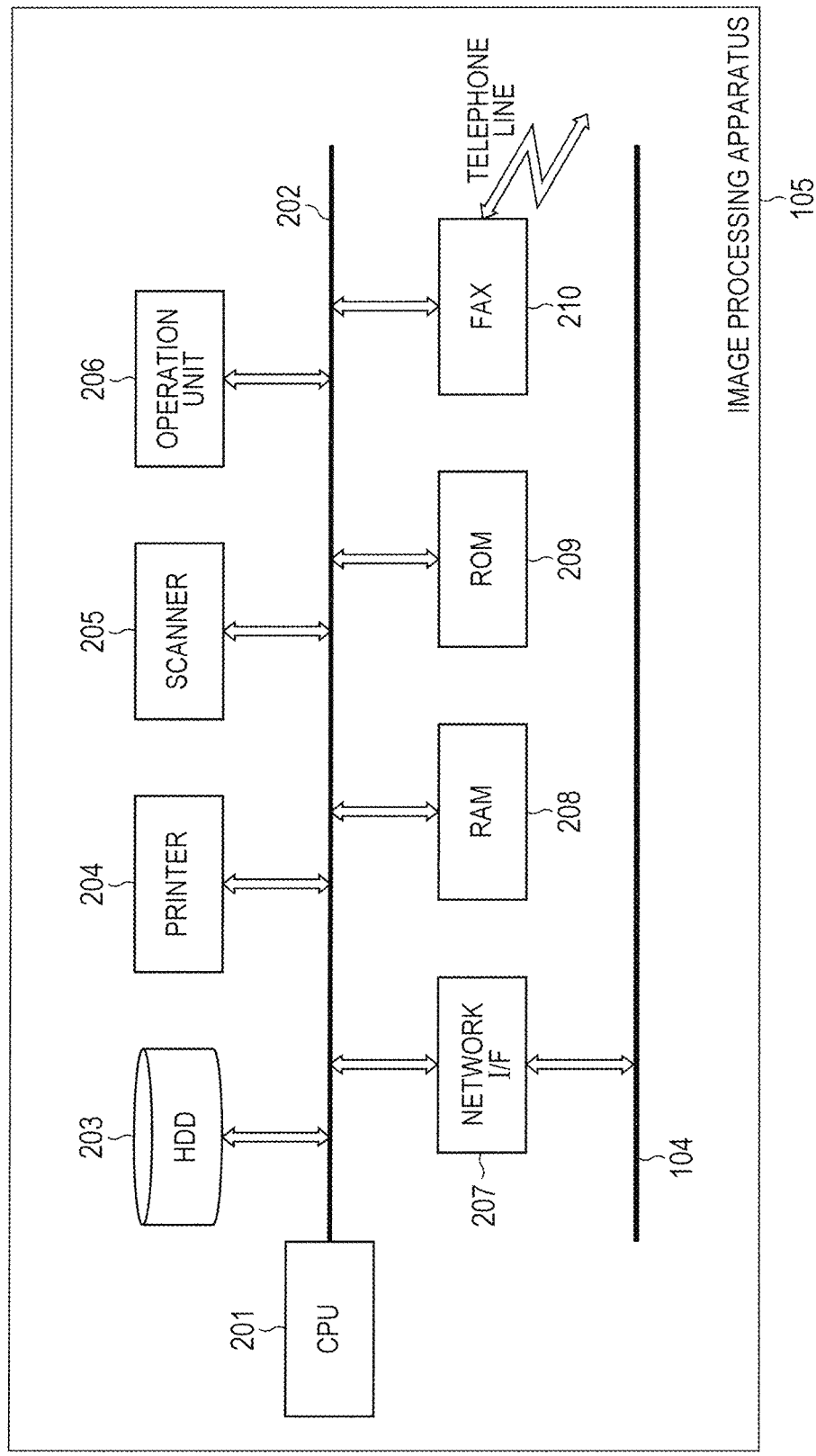
FIG. 2 is a diagram illustrating a construction of hardware of an image processing apparatus.

FIG. 2 is a block diagram illustrating an example of a construction of hardware of the image processing apparatus 105. A construction of hardware of the image processing apparatus 103 can be also realized by the construction illustrated in FIG. 2. Therefore, the detailed construction of the image processing apparatus 103 is omitted here.

By loading a program stored in a ROM 209 into a RAM 208, a CPU 201 controls the whole operation of the image processing apparatus 105. The CPU 201 communicates with each construction in the image processing apparatus 105 through a bus 202.

A printer 204 prints an image based on image data which was input onto recording paper (sheet).

A scanner 205 reads an image on an original which was set onto a sheet table by the user and stores image data thus obtained into an HDD 203, the RAM 208, or the like. The scanner 205 includes an automatic document feeder (also referred to as an ADF hereinbelow). After a plurality of originals set onto the ADF were sequentially fed onto the sheet table, the scanner 205 can read them.

The HDD 203 is a hard disk drive containing a hard disk. The HDD 203 can store the image data input by the scanner 205 and various kinds of user data (address book, and the like).

An operation unit 206 includes: a plurality of keys which are used by the user to instruct; and a display unit for displaying various kinds of information to be notified to the user.

A network I/F 207 connects the image processing apparatus 105 to the network 104 and controls transmission and reception of data to/from an external apparatus. For example, the network I/F 207 controls the transmission of the image data scanned by the scanner 205 to the external apparatus such as a computer 101 or the like connected to the network 104.

A FAX 210 transmits and receives the image data through a telephone line.

Figure 3:
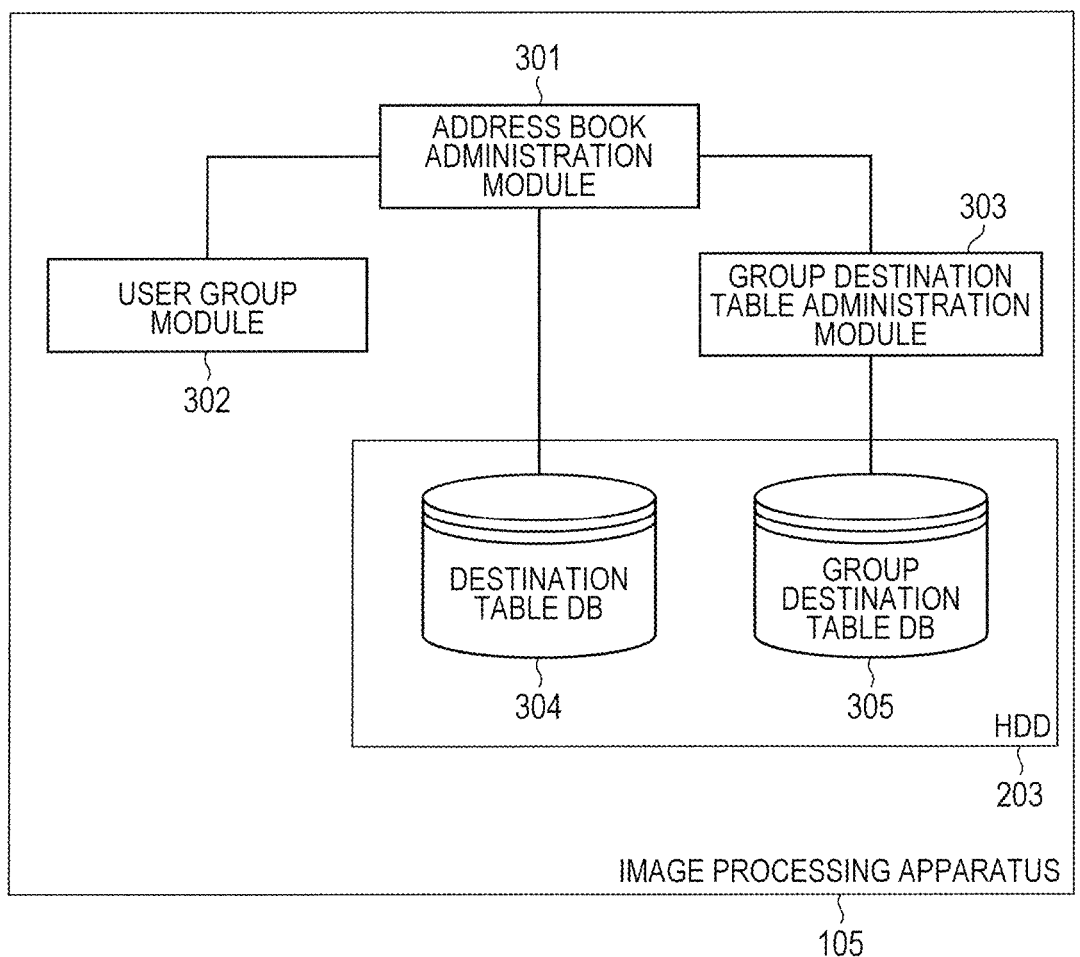
FIG. 3 is a diagram illustrating a construction of modules of the image processing apparatus.

FIG. 3 is a diagram illustrating an example of a construction of modules of the image processing apparatus 105.

An address book administration module 301 performs a management of the destination table list and the destination data.

The destination table list 401 and the destination data 402 which are managed by the address book administration module 301 are stored into a destination table DB 304 in the HDD 203. Details of the destination table list 401 and the destination data 402 will be described hereinlater with reference to FIGS. 4A and 5A.

A user group module 302 performs a management about with which user group each user is associated. Details of the user group module 302 will be described hereinlater with reference to FIG. 6.

A group destination table administration module 303 performs a management of user groups which can access each group destination table list 403 and a management of destination data associated with each group destination table included in the group destination table list 403. Details of the group destination table list 403 will be described hereinlater with reference to FIGS. 4B and 5B.

The group destination table list 403 and the destination data which are managed by the group destination table administration module 303 are stored in a group destination table DB 305 in the HDD 203.

FIG. 4A is a diagram illustrating an example of a display form of the destination table list 401.

When a display request of the destination table list 401 is received from the operation unit 206, the address book administration module 301 obtains the destination table list 401 and the destination data 402 stored in the HDD 203 and displays to the operation unit 206.

In the example illustrated in FIG. 4A, the destination table list 401 includes ten destination tables of (1 to 10). The destination data 402 can be stored in each destination table.

When the destination table list 401 is displayed, all of the destination tables of (1 to 10) included in the destination table list 401 can be always referred to.

FIG. 4B is a diagram illustrating an example of a display form of the group destination table list 403.

When a display request of the group destination table list 403 is received from the operation unit 206, the address book administration module 301 obtains information of the user group which is operating at present from a user group module 302. It is assumed that information of the user who is operating is included in the display request of the group destination table list 403.

The address book administration module 301 notifies the group destination table administration module 303 of the obtained user group.

The group destination table administration module 303 retrieves the group destination table list corresponding to the user group notified from the address book administration module 301 from the HDD 203 (group destination table DB 305). The group destination table administration module 303 returns the retrieved group destination table list 403 and destination data 404 associated therewith to the address book administration module 301.

The address book administration module 301 displays the group destination table list 403 and the destination data 404 associated therewith which were obtained from the group destination table administration module 303 to the operation unit 206.

As mentioned above, when the group destination table list 403 is displayed, only the group destination table associated with the user group to which the user who is operating the operation unit 206 belongs is displayed.

As mentioned above, in the embodiment, the destination table included in the destination table list 401 is an example of the destination table of the first type and there is no access restriction in this destination table. The group destination table included in the group destination table list 403 is an example of the destination table of the second type and, to this group destination table, the access can be restricted every user group.

FIG. 5A is a diagram illustrating an example of an administration table in which the destination table and the destination data are registered so as to be associated with each other.

Any one of destination table IDs 501 of (1 to 10) is uniquely allocated to each destination table 502 as identification information (ID information) to identify the destination table included in the destination table list 401. Each destination data 503 is associated with each destination table and stored into the HDD 203 (destination table DB 304). The administration table illustrated in FIG. 5A is also stored in the image processing apparatus 103.

FIG. 5B is a diagram illustrating an example of an administration table in which the group destination table, the user group, and the destination data are registered so as to be associated with each other.

Any one of group destination table IDs 504 of (1 to N) is uniquely allocated to each group destination table 505 as identification information (ID information) to identify the group destination table included in the group destination table list 403. In this instance, N is a positive integer which changes dynamically in accordance with the settings.

A user group 506 which can access the relevant group destination table and each destination data 507 are associated with each other in each group destination table 505 and stored into the HDD 203 (group destination table DB 305).

FIG. 5C is a diagram illustrating an example of data which is stored into each of the destination data 503 and 507.

In the example illustrated in FIG. 5C, a destination name, a name of the host to which data is transmitted, a folder path name, a user name, and a password are stored into the destination data. The user name and the password illustrated in FIG. 5C are necessary when the user logs-in the host name illustrated in FIG. 5C.

FIG. 6 is a diagram illustrating an example of an administration table in which each user and the user group are registered so as to be associated with each other.

As identification information (ID information) to identify the user group, a unique group ID is allocated to each user group. The user who can access has been allocated to each user group every user group (refer to a column of the included users).

The user group module 302 retrieves the user received from the address book administration module 301 from the column of the included users in the administration table illustrated in FIG. 6 and returns the information of all of the user groups to which the user belongs to the address book administration module 301.

Figure 7:
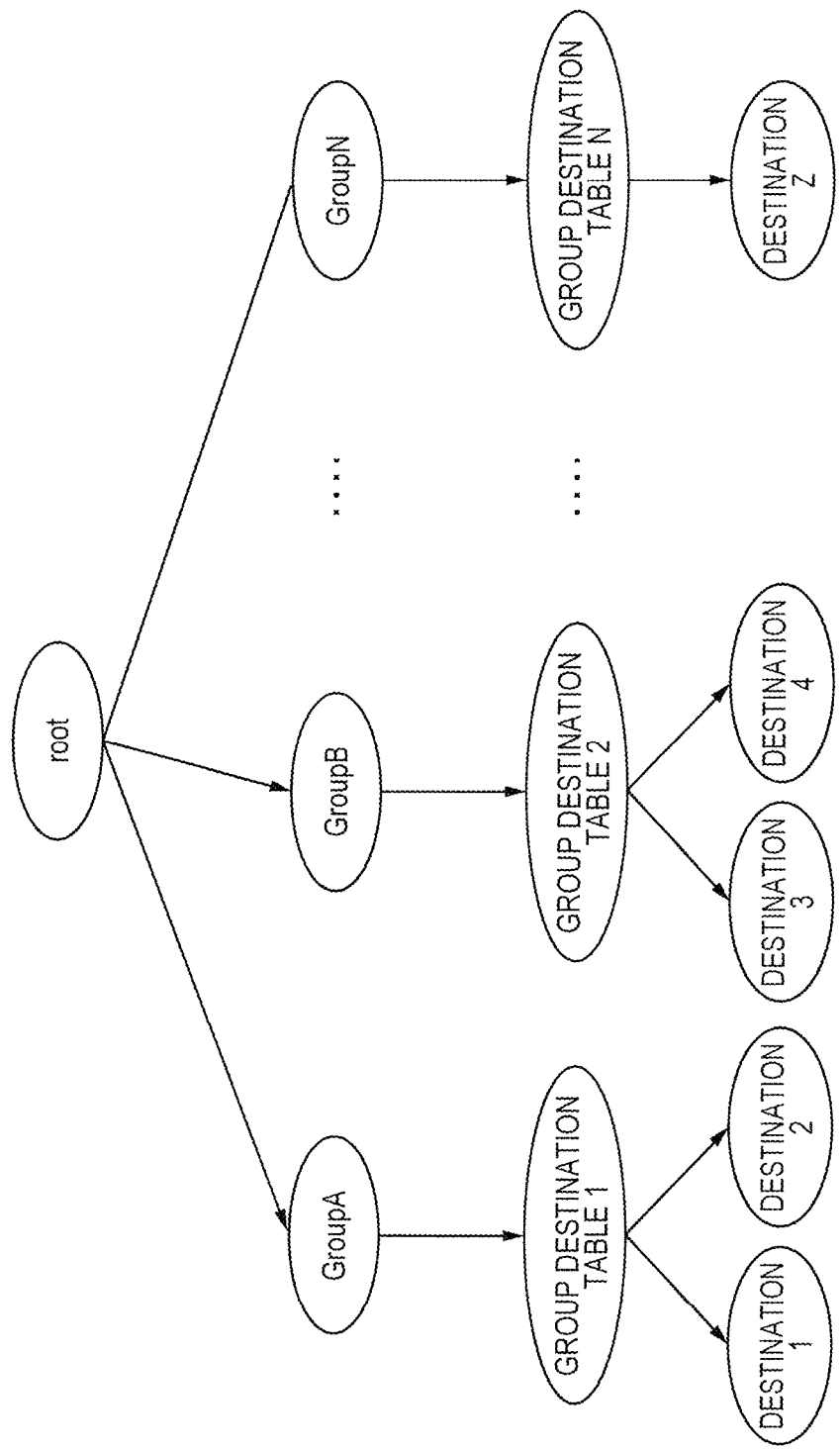
FIG. 7 is a diagram illustrating relations among user groups, group destination tables, and destination data.

FIG. 7 is a diagram illustrating relations among the user groups, the group destination tables, and the destination data described with reference to FIGS. 5A to 5C and 6 from a viewpoint of a data structure.

The user groups, the group destination tables, and the destination data are managed by a tree structure. Specifically describing, each group destination table is associated under a node of each user group (GroupA or the like) and each destination data is further associated under each group destination table.

Figure 8:
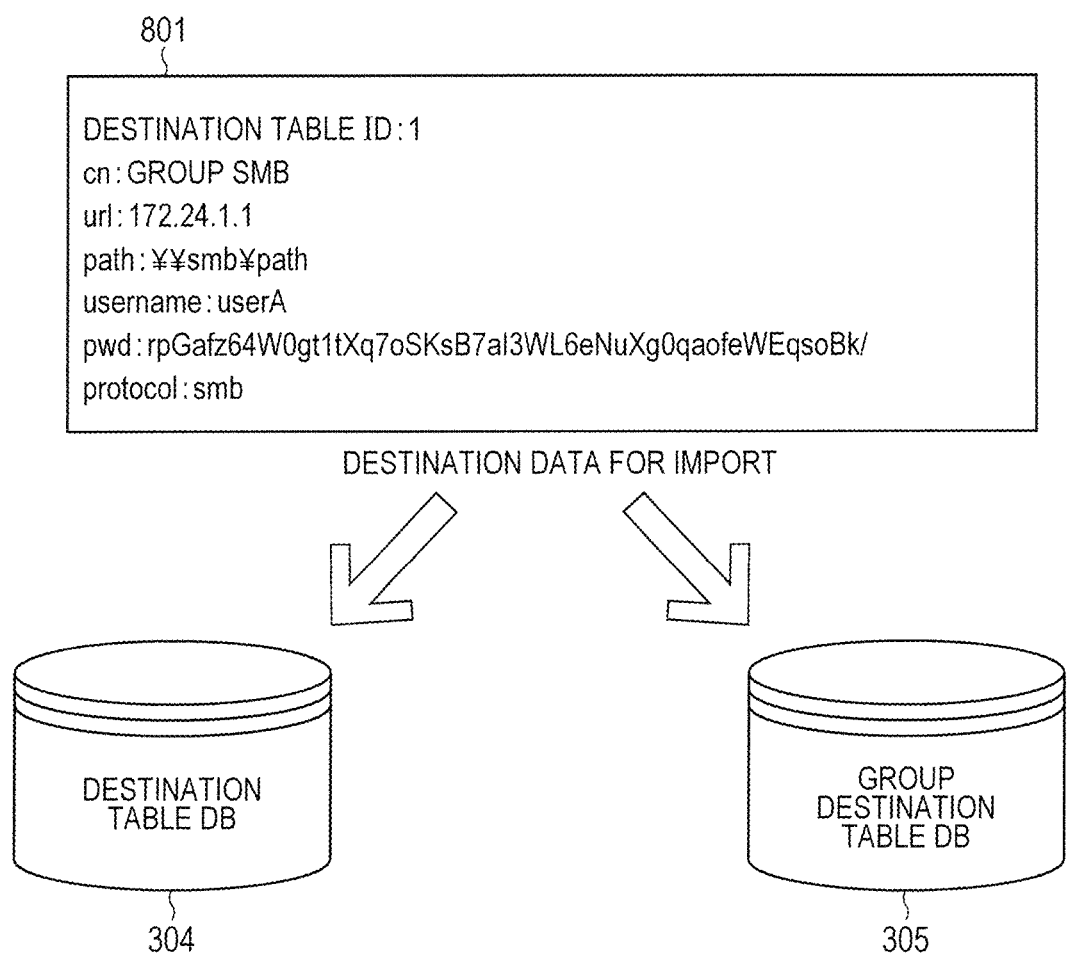
FIG. 8 is a diagram illustrating a data structure of destination data for import and import destinations.

FIG. 8 is a diagram conceptually illustrating an example of a data structure of destination data 801 for import and import destinations when the destination data is imported into the image processing apparatus 105.

When the address book administration module 301 receives an import request, the destination data 801 for import is imported into either the destination table DB 304 or the group destination table DB 305 in accordance with the destination data 801 for import. When the destination data 801 for import is imported into the group destination table DB 305, it is imported through the group destination table administration module 303.

An example of the operation of the image processing apparatus 105 at the time of importing the destination data for import (destination data) will be described hereinbelow with reference to a flowchart of FIG. 9.

A process shown in the flowchart is executed by, for example, the CPU 201 after a program stored in the ROM 209 was loaded into the RAM 208. When a result of the execution by the CPU 201 is displayed, the execution result is displayed to the operation unit 206.

When the import request is received, in S901, the address book administration module 301 executes a first obtaining process for obtaining the destination data 801 for import. The address book administration module 301 retrieves the data of the group destination table from the destination data 801 for import.

Subsequently, in S902, the address book administration module 301 discriminates whether or not the data of the group destination table is included in the destination data 801 for import.

As a result of the discrimination, if the data of the group destination table is not included in the destination data 801 for import, the processing routine advances to S903. In S903, the address book administration module 301 discriminates whether or not an import instruction to the group destination table 505 has been made at the time of requesting the import.

An example of the import instruction to the group destination table 505 will now be described with reference to FIG. 10.

Figure 10:
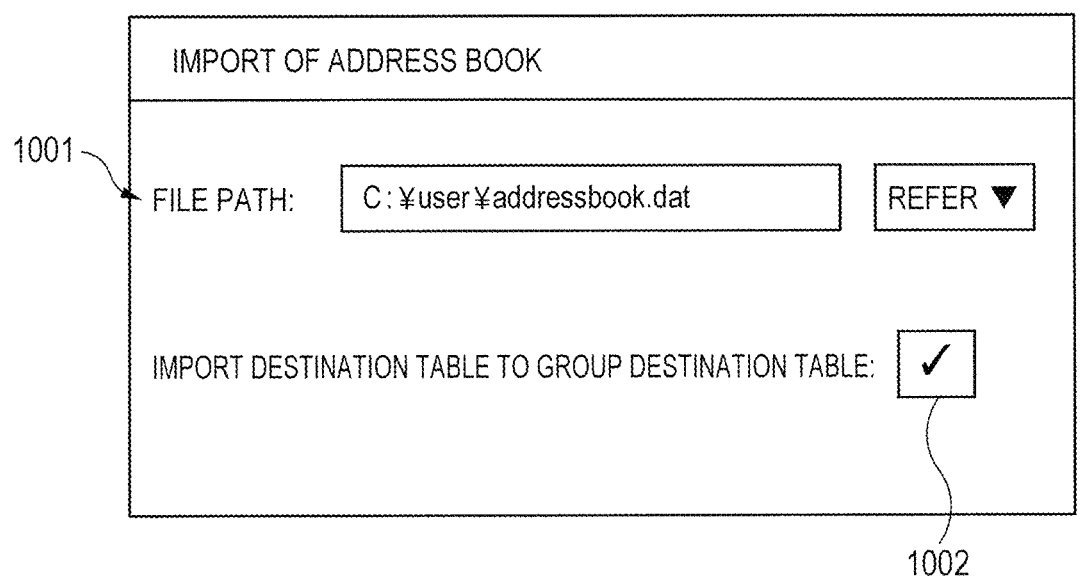
FIG. 10 is a diagram illustrating a first example of a display screen to instruct the import.

FIG. 10 is a diagram illustrating an example of a display screen for instructing the image processing apparatus 105 to import the destination data 801 for import from the Web Browser of the computer 101. A location where the destination data 801 for import has been stored is designated to a file path 1001.

By checking a check box 1002 of "IMPORT DESTINATION TABLE TO GROUP DESTINATION TABLE" at the time of import, the import instruction to import each destination data included in the destination data 801 for import into the group destination table 505 is performed. The address book administration module 301 executes a second obtaining process for obtaining the import instruction and executes a process of S903.

As a result of the discrimination of S903, if it is determined that there is not the import instruction to the group destination table 505, S921 follows. In S921, the address book administration module 301 obtains each destination data and a destination table ID (identification information to identify the destination table) from the destination data 801 for import.

The address book administration module 301 retrieves the destination table ID 501 which coincides with the destination table ID obtained from the destination data 801 for import and specifies the destination table of an import destination side from the destination table 502.

The address book administration module 301 imports the destination data obtained from the destination data 801 for import into the destination table DB 304 in the HDD 203 as destination data 503 associated with the specified destination table 502.

The address book administration module 301 executes the foregoing importing process to all of the destination data included in the destination data 801 for import. The process according to the flowchart of FIG. 9 is ended.

On the other hand, as a result of the discrimination of S903, if it is determined that there is the import instruction to the group destination table 505, S904 follows. In S904, the address book administration module 301 discriminates whether or not the setting of a use permission of the group destination table is validated.

Whether or not the setting of the use permission of the group destination table is validated is preset, for example, based on the operation to the display screen displayed to the operation unit 206 of the image processing apparatus 105 and is stored into the HDD 203. The setting about whether or not the setting of the use permission of the group destination table is validated may be performed to the image processing apparatus 105 from the Web Browser of the computer 101.

As a result of this discrimination, if the setting of the use permission of the group destination table is validated, S905 follows. In S905, the address book administration module 301 obtains the number of destination table IDs (that is, the number of destination tables) included in the destination data 801 for import. Subsequently, in S906, the address book administration module 301 obtains the number of group destination tables from the group destination table administration module 303.

Subsequently, in S907, the address book administration module 301 discriminates whether or not the number obtained in S906 is equal to or larger than the number obtained in S905.

As a result of this discrimination, if the number obtained in S906 is equal to or larger than the number obtained in S905, S908 follows. In S908, the address book administration module 301 obtains the destination data of each destination table from the destination data 801 for import and obtains the maximum number of destination data in one destination table.

Subsequently, in S909, the address book administration module 301 obtains the maximum number of destination data manageable by one group destination table from the HDD 203.

The maximum number of destination data manageable by one group destination table is preset, for example, based on the operation to the display screen displayed to the operation unit 206 of the image processing apparatus 105 and is stored into the HDD 203. The setting of the maximum number of destination data manageable by one group destination table may be performed to the image processing apparatus 105 from the Web Browser of the computer 101.

Subsequently, in S910, the address book administration module 301 discriminates whether or not the maximum number obtained in S909 is equal to or larger than the maximum number obtained in S908.

As a result of this discrimination, if the maximum number obtained in S909 is equal to or larger than the maximum number obtained in S908, it is determined that the apparatus is in a state where the destination data 801 for import can be imported to the group destination table, and S911 follows. In S911, the address book administration module 301 obtains each destination data and the destination table ID associated with each destination data from the destination data 801 for import.

The address book administration module 301 retrieves the group destination table ID 504 which coincides with the destination table ID obtained from the destination data 801 for import. The address book administration module 301 specifies the group destination table 505 associated with the group destination table ID 504 as a group destination table of the import destination side.

The address book administration module 301 imports the destination data, as destination data 507, obtained from the destination data 801 for import for the specified group destination table into the group destination table DB 305.

The address book administration module 301 executes the foregoing importing process to all of the destination data included in the destination data 801 for import. The process according to the flowchart of FIG. 9 is ended.

As a result of the discrimination in S904, if the setting of the use permission of the group destination table is not validated (is invalid), the group destination table cannot be used. Therefore, in S922, the address book administration module 301 determines that there is such an import error that the destination data 801 for import cannot be imported to the group destination table has.

Subsequently, in S923, the computer 101 displays an error display screen to its own Web Browser. FIG. 11A is a diagram illustrating an example of the error display screen which is displayed in the case where the processing routine advances from S904 to S922 and S923.

As a result of the discrimination in S907, if the number obtained in S906 is smaller than the number obtained in S905, the address book administration module 301 cannot import all of the destination tables of the destination data

801 for import into the group destination table. Therefore, in S922, the address book administration module 301 determines that there is such an import error that the destination data 801 for import cannot be imported to the group destination table.

Subsequently, in S923, the computer 101 displays an error display screen to its own Web Browser. FIG. 11B is a diagram illustrating an example of the error display screen which is displayed in the case where the processing routine advances from S907 to S922 and S923.

As a result of the discrimination in S910, if the maximum number obtained in S909 is smaller than the maximum number obtained in S908, all of the destination data associated with the destination table of the destination data 801 for import cannot be imported to the group destination table. Therefore, in S922, the address book administration module 301 determines that there is such an import error that the destination data 801 for import cannot be imported to the group destination table.

Subsequently, in S923, the computer 101 displays an error display screen to its own Web Browser. FIG. 11C is a diagram illustrating an example of the error display screen which is displayed in the case where the processing routine advances from S910 to S922 and S923.

As a result of the discrimination in S902, if the data of the group destination table is included in the destination data 801 for import, S912 follows. In S912, the address book administration module 301 obtains the destination table data and the group destination table data from the destination data 801 for import. If the data of the destination table is not included in the destination data 801 for import, the address book administration module 301 obtains only the group destination table data.

Processes of S913 to S918 are substantially the same as those of S905 to S910, respectively. Therefore, a detailed description of the processes of S913 to S918 is omitted. However, in S913 and S916, the number of group destination tables and the maximum number of destination data in one group destination table are obtained from the destination data 801 for import.

In S918, if the maximum number obtained in S917 is equal to or larger than the number obtained in S916, S919 follows. In S919, the address book administration module 301 imports the destination data included in the data of the group destination table obtained in S912 into the group destination table DB 305 through the group destination table administration module 303. For example, the address book administration module 301 obtains each destination data and a group destination table ID associated with each destination data from the destination data 801 for import. The address book administration module 301 retrieves the group destination table ID 504 which coincides with the obtained group destination table ID and specifies the group destination table 505 associated with the group destination table ID 504 as a group destination table of the import destination side. The address book administration module 301 imports the destination data, as destination data 507, obtained from the destination data 801 for import into the specified group destination table (group destination table DB 305).

Subsequently, in S920, the address book administration module 301 imports the destination data included in the data of the destination table obtained in S912 into the destination table DB 304. For example, the address book administration module 301 retrieves the destination table ID 501 which coincides with the destination table ID obtained from the destination data 801 for import and specifies the destination table of the import destination side from the destination table 502. The address book administration module 301 imports the destination data obtained from the destination data 801 for import into the destination table DB 304 in the HDD 203 as destination data 503 associated with the specified destination table 502.

The address book administration module 301 executes the foregoing importing process of S919 and S920 to all of the destination data included in the destination data 801 for import. The process according to the flowchart of FIG. 9 is ended.

If the destination table ID and the group destination table ID cannot be retrieved in S911, S919, S920, and S921, the processing routine advances to S922 and S923 and an error display screen showing that the data cannot be imported into the destination table and the group destination table may be displayed.

As mentioned above, in the embodiment, at the time of the import request of the destination data 801 for import, an import instruction to the group destination table 505 is performed. The group destination table ID 504 which coincides with the destination table ID obtained from the destination data 801 for import is retrieved. The group destination table 505 associated with the group destination table ID 504 is specified as a group destination table of the import destination side. The destination data obtained from the destination data 801 for import is imported as destination data 507 into the specified group destination table (group destination table DB 305). Therefore, at the time of importing the destination data 801 for import, merely by designating by the user, the destination data can be imported to the group destination table while taking over a classification by the destination table, and the group destination table can be soon used. Therefore, a usability in the case where the destination data 801 for import exported from the image processing apparatus 103 which does not have the function of the group destination table is imported into the image processing apparatus 105 having the function of the group destination table is improved. Thus, a troublesomeness which is required when the address book (destination table) is exported/imported between the image processing apparatuses 103 and 105 can be reduced.

In the embodiment, at the time of the importing process of the destination data 801 for import, the contents of the destination data 801 for import is confirmed. Specifically speaking, whether or not the number of destination tables included in the destination data 801 for import is larger than the number of group destination tables is confirmed and whether or not the maximum value of the destination data included in one destination table is larger than the maximum value manageable by one group destination table is confirmed. Therefore, the destination data 801 for import can be certainly imported. When the import error occurs in the confirmation at the time of import, the error message is output every cause of the error. Therefore, the usability of the user is further improved.

(Second Embodiment)

Subsequently, the second embodiment will be described. In the first embodiment, the case where when the import error occurs, the error message is unconditionally displayed has been described as an example. In the second embodiment, when the import error occurs, either a mode of importing the destination data of the number as many as the importable data or a mode of displaying the error message is selected. As mentioned above, the second embodiment and the first embodiment differ mainly with respect to a part of the process in the case where the import error has occurred. Therefore, in the description of the embodiment, substantially the same portions as those in the first embodiment are designated by the same reference numerals as those in FIGS. 1 to 11C and their detailed description is omitted.

An example of the operation of the image processing apparatus 105 in the case of importing the destination data for import (destination data) will now be described with reference to FIG. 12.

Figure 9:
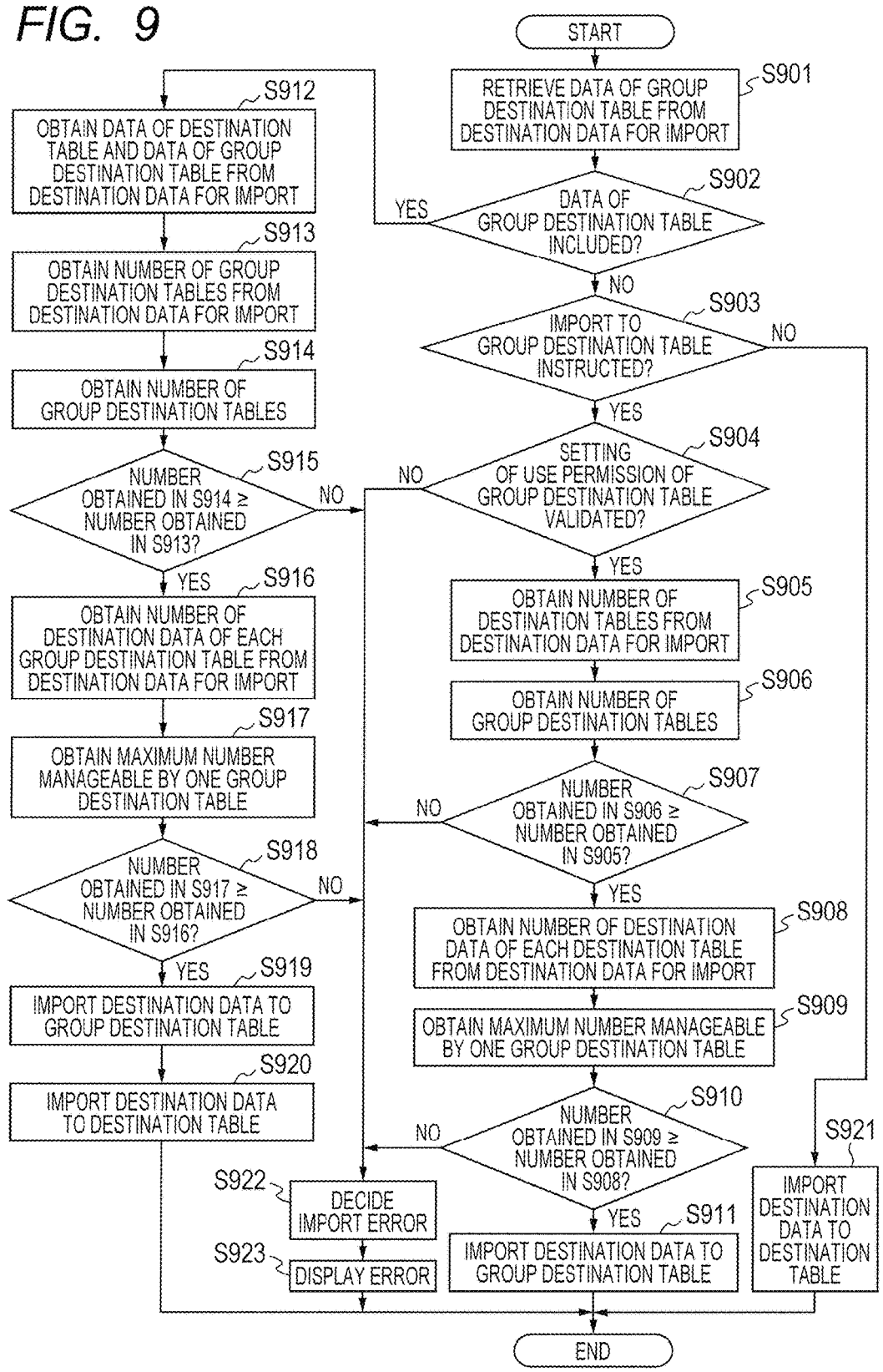
FIG. 9 is a flowchart for describing a first example of the operation of the image processing apparatus.

Processes of S1201 to S1222 are substantially the same as those of S901 to S922 in FIG. 9.

If it is determined in S1222 that the import error has occurred, in S1223, the address book administration module 301 discriminates whether or not there is an instruction to import the destination data of the number as many as the importable data at the time of the import request.

An example of the instruction to import the destination data of the number as many as the importable data will now be described with reference to FIG. 13.

Figure 13:
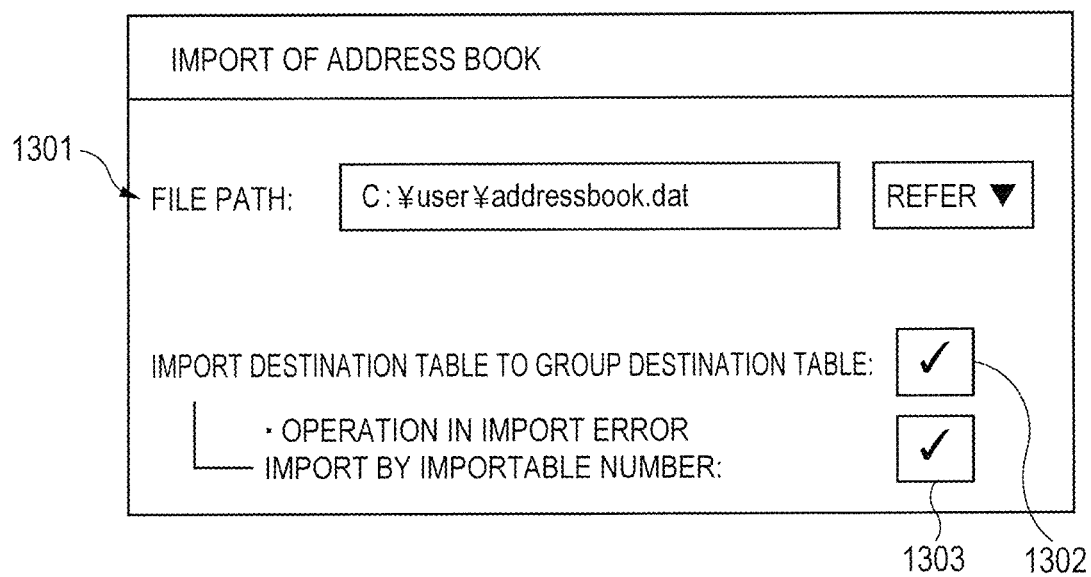
FIG. 13 is a diagram illustrating a second example of a display screen to instruct the import.

FIG. 13 is a diagram illustrating an example of a display screen to instruct the image processing apparatus 105 to import the destination data 801 for import from the Web Browser of the computer 101 in a manner similar to FIG. 10.

FIG. 13 differs from FIG. 10 with respect to a point that such a setting as "IMPORT BY IMPORTABLE NUMBER" can be performed as an operation at the time of the import error.

A location where the destination data 801 for import has been stored is designated in a file path 1301.

Upon importing, by checking a check box 1302 of "IMPORT DESTINATION TABLE TO GROUP DESTINATION TABLE", such an import instruction that each destination data included in the destination data 801 for import is imported into the group destination table 505 is performed. By checking a check box 1303 of "OPERATION IN IMPORT ERROR IMPORT BY IMPORTABLE NUMBER", even in the case of the import error, the destination data of the number as many as the importable data can be imported. Specifically speaking, even if the number of group destination tables of the image processing apparatus 105 of the import destination side is small or even if the maximum number of destination data manageable by each group destination table is small, the destination data of the number as many as the importable data can be imported.

The address book administration module 301 executes the second and third obtaining processes for obtaining such an import instruction and executes the process of S1222.

The check of the check box 1303 is validated only in the case the check box 1302 has been checked. For example, if the check box 1302 is not checked, it is disabled to check the check box 1303.

Figure 12:
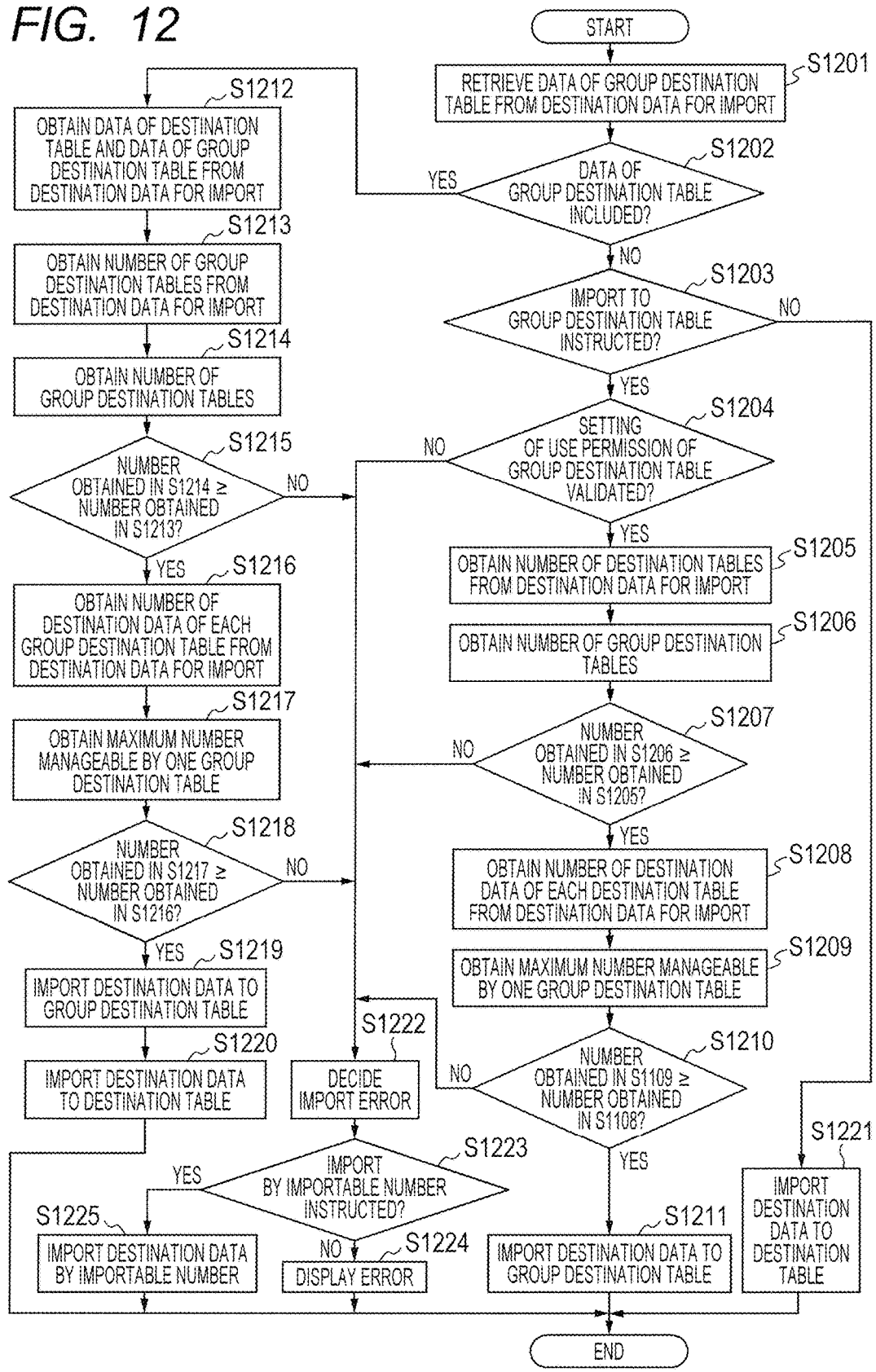
FIG. 12 is a flowchart for describing a second example of the operation of the image processing apparatus.

Returning to the description of FIG. 12, as a result of the discrimination of S1223, if there is the instruction to import the destination data of the number as many as the importable data at the time of the import request, S1225 follows. In S1225, the address book administration module 301 imports the destination data of the number as many as the importable data. A method of importing the destination data can be realized by substantially the same method as that described in S911 and S919 in FIG. 9. Priorities of the destination data to be imported are preset, for example, based on the operation to the screen which is displayed to the operation unit 206 of the image processing apparatus 105 and are stored into the HDD 203. For example, the destination data can be imported in order from the head destination data of the destination data 801 for import.

On the other hand, as a result of the discrimination of S1223, if there is not the instruction to import the destination data of the number as many as the importable data at the time of the import request, S1224 follows. In S1224, the computer 101 displays an error display screen to its own Web Browser. The error display screen of the contents according to the contents of the error is displayed in a manner similar to that described in S923 in FIG. 9 (refer to FIGS. 11A to 11C).

As mentioned above, in the embodiment, upon import requesting, the instruction to import the destination data of the number as many as the importable data can be performed. If there is the instruction to import the destination data of the number as many as the importable data, the destination data of the number as many as the importable data is imported. Therefore, in addition to the effect described in the first embodiment, by importing all of the destination data of the number as many as the importable data, such a troublesomeness that the destination data is registered by the manual input from the beginning can be omitted. Thus, the usability in the case where the destination data 801 for import exported from the image processing apparatus 103 which does not have the function of the group destination table is imported to the image processing apparatus 105 having the function of the group destination table is further improved.

(Third Embodiment)

Subsequently, the third embodiment will be described.

General data formats exist as a data format of the address book. For example, vCard, CSV (comma-separated values), and the like exist. Details of vCard have been described in RFC2425 and RFC2426. Details of CSV have been described in RFC4180. Those general data formats of the address book have been standardized. However, in CSV, the user can freely define the tag itself. In vCard, although the tag itself has been defined, the user can freely describe which value into which tag.

As mentioned above, even if the data format of the address book has been standardized, in which meaning the data in the data format is handled is determined every user. Therefore, when the general data formats of the address book are processed in the image processing apparatus, if it is impossible to recognize that the tags of those data formats are the data of which meaning, the data cannot be correctly handled as data of the address book. Thus, a troublesomeness which is required when exporting and importing the address book increases.

In the embodiment, therefore, in addition to the construction of the first embodiment, at the time of the import request, a file format of the destination data for import, a tag to be used as a group destination table, and a value which is obtained when a plurality of values have been set in the tag are designated. As mentioned above, the third embodiment and the first embodiment mainly differ with respect to a part of the process at the time of the import request of the destination data for import and a part of the process at the time of the import of the destination data for import. Therefore, in the description of the embodiment, substantially the same portions as those in the first embodiment are designated by the same reference numerals as those in FIGS. 1 to 11C and their detailed description is omitted.

FIGS. 14A and 14B are diagrams illustrating examples of description of the destination data for import of the general data formats of the address book.

FIG. 14A illustrates the example of the description of the destination data for import when the data format is vCard.

The leftmost column (BEGIN, VERSION, UID, or the like) of each row is tag information defined in vCard.

A value after a colon (:) after each tag is a value corresponding to the tag.

A plurality of values can be described in the tag. For instance, in the example illustrated in FIG. 14A, two values of "Company1" and "GENERAL AFFAIRS 1ST SECTION" are set in the tag showing an organization of ORG.

FIG. 14B illustrates an example of a description of the destination data for import when the data format is CSV.

When the data format is CSV, a definition itself of the tag can be freely described. A delimiter between each tag and each value is made by a comma (,).

In the example illustrated in FIG. 14B, the head row is a description showing the tag. For example, a tag which means a group is "GROUP".

The second and third rows are a description of the actual destination data for import. They are described in such a manner that values corresponding to the tags of UID are 001 and 002 and values corresponding to the tag of GROUP are group1 and group2, respectively.

FIG. 15 is a diagram illustrating an example of a display screen for instructing the image processing apparatus 105 to import the destination data for import illustrated in FIG. 8 from the Web Browser of the computer 101.

A location where the destination data for import illustrated in FIG. 8 has been stored is designated to a file path 1501.

At the time of import, by checking a check box 1502 of "IMPORT DESTINATION TABLE TO GROUP DESTINATION TABLE", the import instruction to import each destination data included in the destination data for import into the group destination table 505 is performed.

When importing, as a file format of the destination data for import illustrated in FIG. 8, either vCard or CSV is set by a pull-down menu 1503.

As a tag to be used as a group destination table, any one of ORG, TITLE, and an arbitrary character string is set by a pull-down menu 1504.

If the arbitrary character string is selected here, the arbitrary character string can be registered. Various kinds of character strings can be set as a tag.

The file formats and tags described in the pull-down menus 1503 and 1504 are merely shown as an example and any other formats and tags which are not shown here can be also applied.

In a pull-down menu 1505, when values corresponding to the tag set by the pull-down menu 1504 are obtained, which value should be obtained is set.

For example, in the case of the vCard format illustrated in FIG. 14A, ORG is set as a tag by the pull-down menu 1504. When "1" is set by the pull-down menu 1505, the first value "Company1" is obtained as a value. When ORG is set as a tag by the pull-down menu 1504 and "2" is set by the pull-down menu 1505, the second value "GENERAL AFFAIRS 1ST SECTION" is obtained as a value.

If the number having no value is designated, for example, it is sufficient that the first value is always obtained.

Figure 16:
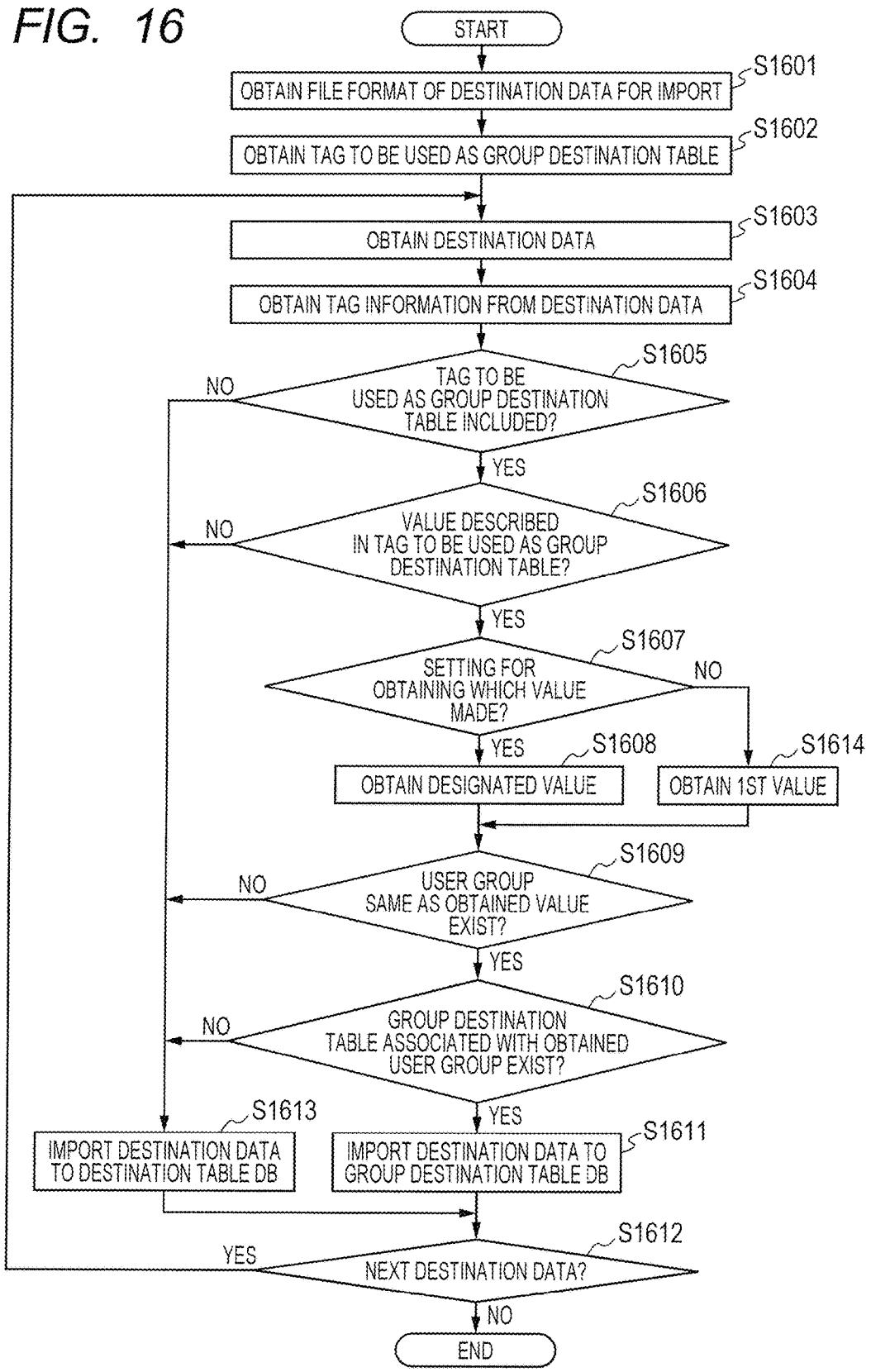
FIG. 16 is a flowchart for describing a third example of the operation of the image processing apparatus.

An example of the process of the image processing apparatus 105 at the time when the destination data obtained from the destination data 801 for import is imported into the group destination table will be described hereinbelow with reference to a flowchart of FIG. 16. The flowchart of FIG. 16 is executed, for example, in S911 and S919 in FIG. 9.

In S1601, the address book administration module 301 executes a fourth obtaining process for obtaining a file format of the destination data for import set by the pull-down menu 1503 in response to the import request.

Subsequently, in S1602, the address book administration module 301 executes a fourth obtaining process for obtaining a tag to be used as a group destination table set by the pull-down menu 1504 in response to the import request.

Subsequently, in S1603, the address book administration module 301 obtains the head destination data in accordance with the file format obtained in S1601.

Subsequently, in S1604, the address book administration module 301 obtains tag information according to the file format from the destination data obtained in S1603.

Subsequently, in S1605, the address book administration module 301 discriminates whether or not the tag information obtained in S1602 is included in the tag information obtained in S1604.

As a result of the discrimination, if no tag information is included, the destination data obtained in S1603 cannot be used as a group destination table. Therefore, in S1613, the address book administration module 301 imports the destination data obtained in S1603 into the destination table DB 304. The processing routine advances to S1612, which will be described hereinlater. The process of S1613 is realized, for example, in a manner similar to the process of S921 in FIG. 9.

If it is determined in S1605 that the tag information is included, S1606 follows. In S1606, the address book administration module 301 obtains the value corresponding to the tag information obtained in S1604 and discriminates whether or not the data is described in such a value.

As a result of the discrimination, if the data is not described in the value, since the data is empty, the destination data obtained in S1603 cannot be used as a group destination table. Therefore, in S1613, the address book administration module 301 imports the destination data obtained in S1603 into the destination table DB 304. The processing routine advances to S1612, which will be described hereinlater.

If it is determined in S1606 that the data is described in the value, S1607 follows. In S1607, the address book administration module 301 discriminates whether or not the setting for obtaining which value has been made by the pull-down menu 1505 in response to the import request.

As a result of the discrimination, if the setting for obtaining which value has been made, S1608 follows. In S1608, the address book administration module 301 obtains the value corresponding to the setting. The processing routine advances to S1609, which will be described hereinlater. If the setting for obtaining which value is not made, S1614 follows. In S1614, the address book administration module 301 obtains the first value. The processing routine advances to S1609.

In S1609, through the user group module 302, the address book administration module 301 confirms whether or not the same values as those obtained in S1608 and S1614 exist as a user group.

As a result of the confirmation, if the same values as those obtained in S1608 and S1614 do not exist as a user group, the destination data obtained in S1603 cannot be used as a group destination table. Therefore, in S1613, the address book administration module 301 imports the destination data obtained in S1603 into the destination table DB 304. The processing routine advances to S1612, which will be described hereinlater.

On the other hand, if the same values as those obtained in S1608 and S1614 exist as a user group, S1610 follows. In S1610, through the group destination table administration module 303, the address book administration module 301 confirms whether or not the group destination table associated with the user group exists.

As a result of the confirmation, if the group destination table associated with the user group does not exist, the destination data obtained in S1603 cannot be used as a group destination table. Therefore, in S1613, the address book administration module 301 imports the destination data obtained in S1603 into the destination table DB 304. The processing routine advances to S1612, which will be described hereinlater.

On the other hand, if the group destination table associated with the user group exists, the destination data obtained in S1603 can be used as a group destination table. Therefore, in S1611, the address book administration module 301 imports the destination data obtained in S1603 into the group destination table DB 305.

In S1612, the address book administration module 301 discriminates whether or not the destination data to be imported exists. As a result of the discrimination, if the destination data to be imported exists, the processing routine is returned to S1603 and the processes of S1603 to S1611 are repeated with respect to such destination data. If there are no more destinations to be imported, the process according to the flowchart of FIG. 16 is ended.

As mentioned above, in the embodiment, at the time of import request, the file format of the destination data for import, the tag to be used as a group destination table, and the values to be obtained in the case where a plurality of values have been set to the tag are designated. In the destination data (relevant designation), if there is the tag to be used as a group destination table and the same user group as the values of the tag and there is the group destination table associated with the user group, such destination data is installed into the group destination table. Therefore, even in the case of importing the destination data of the vCard or CSV format as a general data format of the address book, at the time of import, the file format and the tag to be used as a group destination table can be designated. Consequently, even in the general data format of the address book, immediately after the destination data was imported, it can be used as a group destination table. Therefore, a time which is required to move the destination data is eliminated and the usability of the user is improved. Thus, the troublesomeness which is required when exporting and importing the address book (destination table) between the image processing apparatuses 103 and 105 can be reduced.

Further, even if a plurality of values were set to the tag, which value should be obtained can be set at the time of import. Therefore, it is possible to more flexibly cope with various kinds of data formats.

In the embodiment, the case of executing the flowchart of FIG. 16 in S911 and S919 in FIG. 9 has been described as an example. However, it is not always necessary to use such a method. For instance, the flowchart of FIG. 16 may be executed in S1211 and S1219 in FIG. 12. The flowchart of FIG. 16 may be executed at timing different from that in the flowchart of FIG. 9 or FIG. 12. In this case, when only the group destination table is imported without presuming a case of importing the destination table, the check box 1502 is unnecessary in the display screen illustrated in FIG. 15.

The foregoing embodiments have merely been shown as an example of embodying the invention and the technical scope of the invention should not be limitedly interpreted by them. That is, the invention can be embodied in various forms without departing from a technical idea or a principal feature of the invention.

(Other Embodiments)

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140682, filed Jul. 8, 2014, which is hereby incorporated by reference herein in its entirety.

What is claimed is:

1. An image processing apparatus comprising:
a transfer control unit configured to control transferring an image data to a destination indicated by a destination data;
a receiving unit configured to receive an instruction for importing the destination data to a destination table having a destination group which is configured to have a destination data and the destination data in the destination group has an access limitation within users of the destination group wherein the destination data indicates a destination to which the image forming apparatus sends the image processing data;
setting unit configured to set whether or not the destination group in the destination table is to be used; and
an importing unit configured to import the destination data to the destination group in the destination table in accordance with the reception of the instruction by the receiving unit in a case where the setting unit sets the destination group is to be used and not to import the destination data to the destination group in the destination table in a case where the setting unit does not set the destination group is to be used;
wherein the transfer control unit, the receiving unit, the setting unit and the importing unit are implemented by at least one processor.

2. The image processing apparatus according to claim 1, further comprising:
a discriminating unit configured to discriminate whether or not the apparatus is in a state where the destination data in the destination table of the first type can be imported with the destination table of the second type in accordance with the instruction is received by the receiving unit; and an output unit configured to output information showing that the destination data cannot be imported if it is determined by the discriminating unit that the apparatus is not in the state where the destination data in the destination table of the first type can be imported with said destination table of the second type.

3. The image processing apparatus according to claim 2, wherein the discriminating unit discriminates whether or not a setting of a use permission of the destination table of the second type is validated, and if the setting of the use permission of the destination table of the second type is not validated, the discriminating unit determines that the apparatus is not in the state where the destination data in the destination table of the first type can be imported as the destination data in the destination table of the second type.

4. The image processing apparatus according to claim 2, wherein the discriminating unit discriminates whether or not the number of destination tables of the second type which can be stored by the storing unit is equal to or larger than the number of destination tables of the first type to which the destination data for import belongs, and when the number of destination tables of the second type which can be stored by the storing unit is smaller than the number of destination tables of the first type to which the destination data for import belongs, the discriminating unit determines that the apparatus is not in the state where the destination data in the destination table of the first type can be imported as the destination data in the destination table of the second type.

5. The image processing apparatus according to claim 2, wherein:

the discriminating unit discriminates whether or not the maximum number of destination data that can be managed in the one destination table of the second type is equal to or larger than the maximum number of destination data in the one destination table of the first type to which the destination data for import belongs; and when the maximum number of destination data that can be managed in the one destination table of the second type is smaller than the maximum number of destination data in the one destination table of the first type to which the destination data for import belongs, the discriminating unit determines that the apparatus is not in the state where the destination data in the destination table of the first type can be imported as the destination data in the destination table of the second type.

6. The image processing apparatus according to claim 3, wherein the output unit further outputs information showing a cause by which the destination data in the destination table of the first type cannot be imported as the destination data in the destination table of the second type in accordance with a result of the discrimination by the discriminating unit.

7. he image processing apparatus according to claim 2, wherein:

the receiving unit can receive an instruction for importing the destination data in the destination table of the first type of the number as many as the number of destination data which can be imported into the destination table of the second type; and even when it is determined by the discriminating unit that the apparatus is not in the state where the destination data in the destination table of the first type can be imported into the destination table of the second type, if the instruction for importing the destination data in the destination table of the first type of the number as many as the number of destination data which can be imported into the destination table of the second type is received by the receiving unit, as the destination data in the destination table of the second type, the importing unit imports the destination data in the destination table of the first type of the number as many as the number of destination data which can be imported as destination data in the destination table of the second type in the destination data for import.

8. The image processing apparatus according to claim 1, further comprising obtaining unit configured to obtain at least either identification information for identifying the destination table of the first type and the destination data associated with the identification information or identification information for identifying the destination table of the second type and the destination data associated with the identification information, and wherein the importing unit imports the destination data associated with the identification information for identifying the destination table of the first type into the destination table of the second type having the same identification information as the identification information for identifying the destination table of the first type obtained by the obtaining unit.

9. A control method of an image processing apparatus, comprising:

controlling transferring an image data to a destination indicated by a destination data;

obtaining an instruction for importing the destination data to a destination table having a destination group which is configured to have a destination data and the destination data in the destination group has an access limitation within users of the destination group wherein the destination data indicates a destination to which the image forming apparatus sends the image processing data;

setting whether or not the destination group in the destination table is to be used; and importing the destination data to the destination group in the destination table in accordance with obtaining of the instruction in a case where the setting sets the destination group is to be used and not to import the destination data to the destination group in the destination table in a case where the setting does not set the destination group is to be used;

wherein the controlling, obtaining, setting, and importing are performed by at least one processor operating in accordance with instructions stored in at least one memory.

10. A non-transitory computer-readable storage medium which stores a program for causing a computer to perform a control method of an image processing apparatus, the method comprising:

controlling transferring an image data to a destination indicated by a destination data;

obtaining an instruction for importing the destination data to a destination table having a destination group which is configured to have a destination data and the destination data in the destination group has an access limitation within users of the destination group wherein the destination data indicates a destination to which the image forming apparatus sends the image processing data;

setting whether or not the destination group in the destination table is to be used; and importing the destination data to the destination group in the destination table in accordance with obtaining of the instruction in a case where the setting sets the destination group is to be used and not to import the destination data to the destination group in the destination table in a case where the setting does not set the destination group is to be used.

\* \* \* \* \*